April 12, 1932. H. J. BOSWORTH 1,853,197
MOUNT FOR X-RAY FILMS AND THE LIKE
Filed Jan. 5, 1931
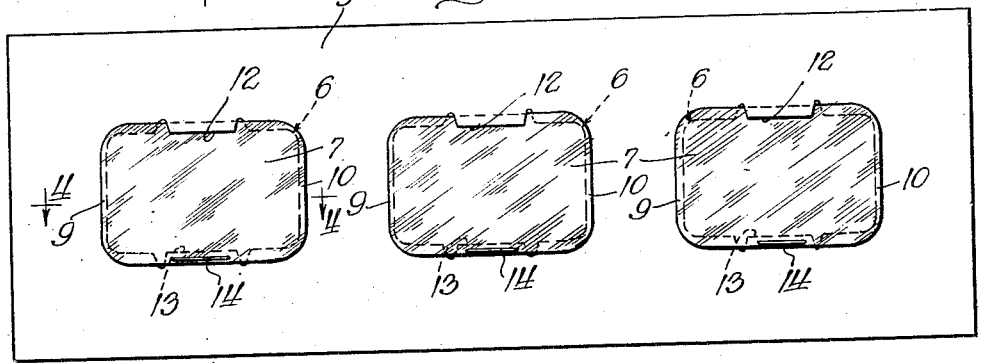
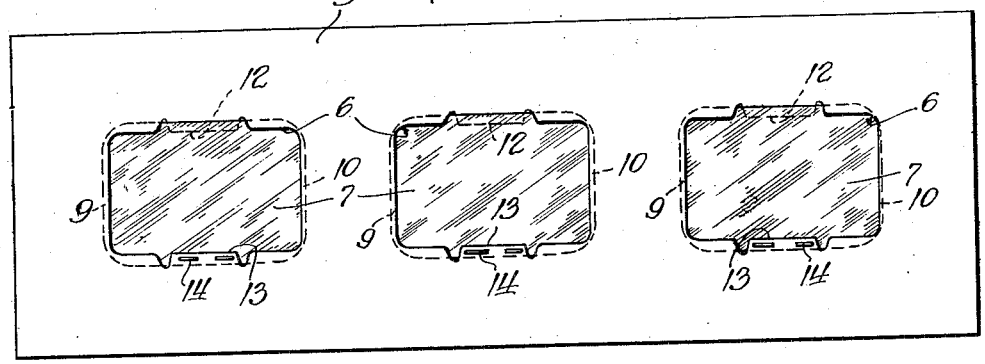
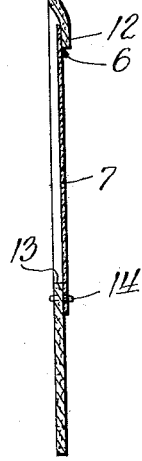
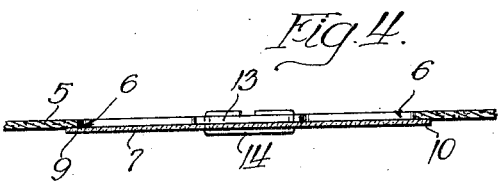
Inventor:
Harry J. Bosworth.
By Brown, Jackson, Boettcher & Dienner
Attys.

Patented Apr. 12, 1932

1,853,197

UNITED STATES PATENT OFFICE

HARRY J. BOSWORTH, OF CHICAGO, ILLINOIS, ASSIGNOR TO HARRY J. BOSWORTH COMPANY, OF CHICAGO, ILLINOIS, A CORPORATION OF ILLINOIS

MOUNT FOR X-RAY FILMS AND THE LIKE

Application filed January 5, 1931. Serial No. 506,537.

My invention relates to mounts for X-ray films and the like and contemplates improvements in the manner of attaching and holding the films to the mount and in place at the openings in the mount through which light is adapted to pass for inspection of the films.

It is well known that dental X-ray films and the like are commonly attached to mounts in place at openings in the mounts through which light is adapted to pass for inspection of the films.

My invention provides means for attaching and holding the films to the mount over the openings through which light is adapted to pass for inspection of the films, which means is simple and inexpensive and holds the films in position and without materially increasing the bulk about the openings in the mount.

With my present invention the engagement of the means for attaching and holding the films to the mount is easily effected and the structure of the mount is simplified.

My invention is illustrated in the accompanying drawings in which:

Figure 1 is a front elevational view of one embodiment of my invention;

Figure 2 is a rear elevational view of the same;

Figure 3 is an enlarged vertical section taken on the line 3—3 of Figure 1; and

Figure 4 is an enlarged fragmentary detail section taken on the line 4—4 of Figure 1.

The mount is illustrated at 5 and comprises a card which may be a piece of thick paper, pasteboard, cardboard, or the like, preferably opaque to exclude the light immediately around the film openings 6 from the vision of the observer when the card is positioned for light to be transmitted through the films for inspection in the usual manner.

In the illustrated embodiment the mount 5 is provided with three openings 6 for mounting three X-ray films 7, but it is to be understood that there may be one or any desired number of such openings for one or any desired number of films or transparencies.

The X-ray films or transparencies 7 may be of the usual form, those shown being dental X-ray films of the usual material commonly comprising a support with a sensitized coating for receiving the picture. The films 7 are also of the usual shape and dimensions to be placed and held within the mouth back of a group of teeth or other portion to be X-rayed as well understood in the art. In the illustrated embodiment the openings 6 are shaped to conform generally with the shapes of the films 7, each opening 6 being preferably somewhat shorter than the length of the film 7 attached and held thereover so that the edges of the mount 5 at the opposite ends of each opening 6 overlap the ends of the film on one side at 9 and 10 and provide marginal end retention for the film at one side of each of the opposite ends thereof. On the same side of the film 7 the card 5 is provided along one longitudinal edge of each opening 6 with an integral tab 12 which loosely overlaps the adjacent edge of one side of the film 7, in the illustrated embodiment the side opposite that engaged by the overlapping end portions 9 and 10. The loose overlapping engagement of the tab 12 with the adjacent longitudinal edge of the film holds the film to the mount and in place over the opening 6.

The mount 5 is provided along the opposite longitudinal edge of the opening 6 with a tab 13 which overlaps the adjacent longitudinal edge of the film 7 on the side of the film opposite that loosely engaged by the opposite tab 12. A wire staple fastener 14 is driven through and punctures the film 7 and the overlapping tab 13 and secures the margin of the film to the tab 13. The particular staple 14 is of a well known paper fastener type having an intermediate portion extending along one side of the combined thicknesses of the film and overlapping tab 13, and its opposite ends extending therethrough and turned back along the opposite sides thereof.

From the foregoing it will be apparent that peculiar and expensive card formations are not necessary, and all that is required is to place the film 7 over the desired opening 6 fastening one marginal edge of the film to the tab 13 by the wire staple 14 and engaging the opposite edge of the film 7 with the opposite side of the tab 12. The film is thereby attached and held to the mount over the opening 6 through which light is adapted to pass for inspection of the film as well understood in the art.

In the instant device there is a staple at one edge of the film only and a tab loosely engaging the opposite edge only of the film. End tabs are eliminated and the opposite ends of the film are entirely free of the mount. This provides secure attachment of the film to the mount and at the same time the mount is free of the film so that it will not be distorted by curling of the film. This combination of a single staple at one edge with a single tab loosely engaging the opposite edge of the film and without tabs at the ends is new, and it produces the new result of permitting freedom between the mount and the film so that curling or buckling of the film will not twist or distort the mount. At the same time the film is held to the mount and in position at the opening and the mount need not be heavy to resist the twisting or curling of the film.

I claim:

1. In combination, a film mount comprising a backing member having an opening, a film disposed at said opening, a tab integral with said backing member at the bottom of the opening and overlapping the bottom edge of said film, a wire staple fastener puncturing the film and tab and securing the margin of the film to said tab, and a tab integral with said mount on the side of said opening opposite said first tab and overlapping and loosely engaging the adjacent edge of the opposite side of the film and holding the same to the backing member and in position at said opening, the ends of the film being entirely free of said backing member.

2. In combination, a film mount comprising a backing member having an opening, a film disposed at said opening, a tab integral with said backing member at the bottom of the opening and overlapping the bottom edge of said film, a wire staple fastener puncturing the film and tab and securing the margin of the film to said tab, and a tab integral with said mount on the side of said opening opposite said first tab and overlapping and loosely engaging the adjacent edge of the opposite side of the film and holding the same to the backing member and in position at said opening, the edges of the mount at the ends of the opening overlapping the ends of the film and being entirely free of the adjacent edges of said film.

3. In combination, a film mount having an opening, a film disposed at said opening, the mount having a single tab only loosely engaging one marginal edge of the film to hold same to the mount and in position at said opening, a wire staple fastener securing to said mount the edge only of said film opposite the edge loosely engaged by said tab and the ends of said film being entirely free of said mount, whereby the film is firmly secured to the mount and curling or buckling of the film will not tend to twist or distort the mount.

4. In combination, a film mount having an opening, a generally rectangular film disposed at said opening, wire staple fastener means securing one edge only of said film to said mount, and tab means integral with said mount and loosely engaging the opposite edge only of said film, the remaining edges of the film being entirely free of said mount.

In witness whereof, I hereunto subscribe my name this 29th day of December, 1930.

HARRY J. BOSWORTH.